United States Patent [19]

Hillen et al.

[11] Patent Number: 5,077,765
[45] Date of Patent: Dec. 31, 1991

[54] METHOD OF SCANNING AN X-RAY IMAGE BY MEANS OF ELECTROMETER PROBES, AND DEVICE FOR PERFORMING THE METHOD

[75] Inventors: Walter Hillen, Aachen; Stephan Rupp, Stolberg-Breinig; Ulrich Schiebel, Aachen, all of Fed. Rep. of Germany

[73] Assignee: U.S. Philips Corporation, New York, N.Y.

[21] Appl. No.: 614,800

[22] Filed: Nov. 14, 1990

[30] Foreign Application Priority Data

Nov. 16, 1989 [DE] Fed. Rep. of Germany ....... 3938096

[51] Int. Cl.$^5$ .......................................... G03G 13/044
[52] U.S. Cl. .......................................... 378/29; 378/28
[58] Field of Search ..................................... 378/28-33

[56] References Cited

U.S. PATENT DOCUMENTS 4,939,759 7/1990 Rupp ..................................... 378/29

FOREIGN PATENT DOCUMENTS 3534768 2/1987 Fed. Rep. of Germany .

Primary Examiner—Craig E. Church
Attorney, Agent, or Firm—William Squire

[57] ABSTRACT

A plurality of electrometer probes (3, 4, 5, 6) scan charge patterns of a photoconductor (1) which is locally uniformly charged prior to the X-ray exposure and is discharged by the exposure in dependence on the intensity of the X-rays. The surface of the photoconductor is scanned after the exposure in order to determine the charge density, the electrometer probes (3, 4, 5, 6) forming for each pixel a pixel value which corresponds to the discharge at the relevant pixel to compensate for sensitivity fluctuations of the electrometer probes included is a calibration operation for the sensitivity of all electrometer probes in that two probes (3, 4, 5, 6) scan an identical section ($a_1 \ldots d_3$) of the image, their relative sensitivity used for correcting the pixel values is derived from comparison of the resultant output signals of the probes (3, 4, 5, 6).

7 Claims, 1 Drawing Sheet

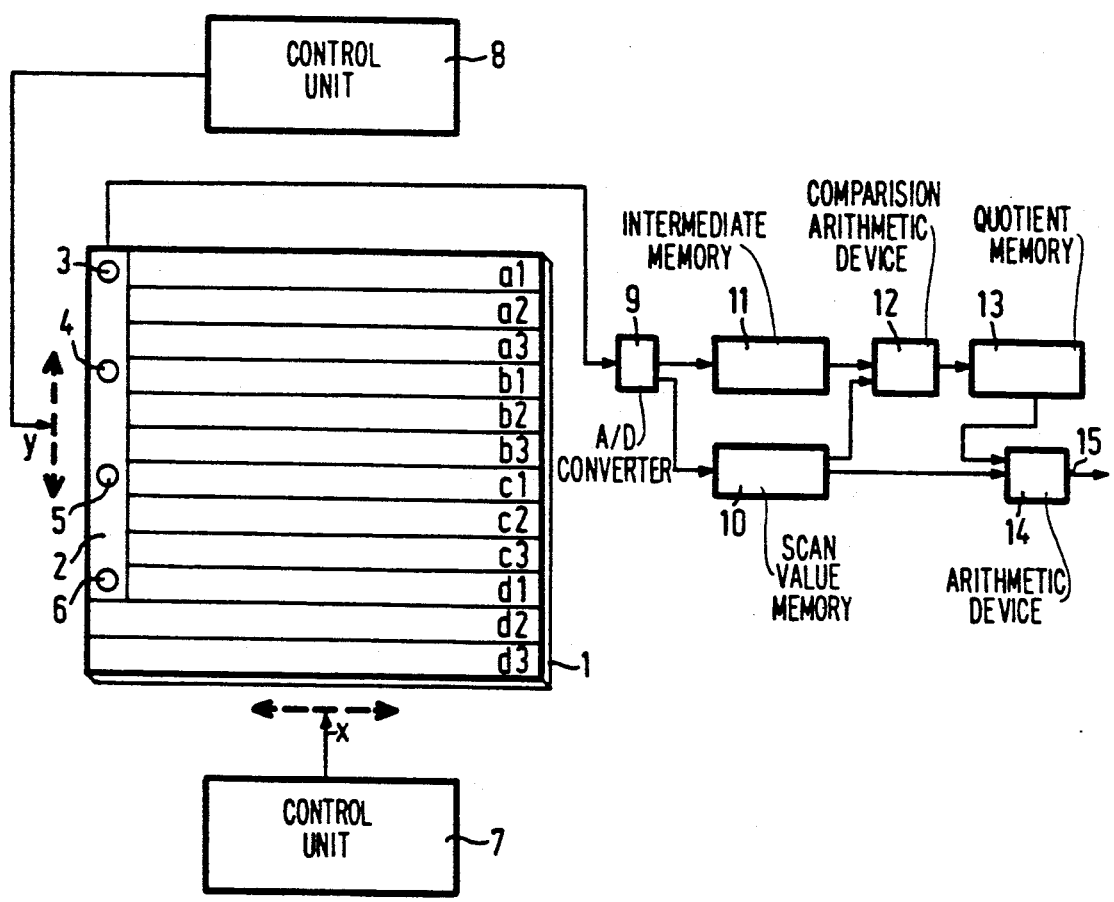

METHOD OF SCANNING AN X-RAY IMAGE BY MEANS OF ELECTROMETER PROBES, AND DEVICE FOR PERFORMING THE METHOD

BACKGROUND OF THE INVENTION

1. Field of the Invention

The invention relates to a method of scanning an X-ray image by means of a plurality of electrometer probes which scan charge patterns of a photoconductor which is locally uniformly charged prior to the X-ray exposure and is discharged by the exposure in dependence on the intensity of the X-rays, the surface of the photoconductor being scanned after the exposure in order to determine the charge density, the electrometer probes forming for each pixel a pixel value which corresponds to the discharge at the relevant pixel. The invention also relates to a device for performing the method. A method and device of this kind are described in German Offenlegingsschrift DE-OS 35 34 768.

2. Description of the Prior Art

According to such a method of scanning an X-ray image, the pixel values of the various pixels are determined from the output signals of a plurality of electrometer probes. Spreads in the sensitivity of the various electrometer probes have a direct effect on the determination of the various pixel values. When the charge patterns are line-wise scanned by the electrometer probes, streakiness occurs in the image due to the varying sensitivity of the probes. It is an object of the invention to mitigate such streakiness to a high degree.

SUMMARY OF THE INVENTION

This object is achieved in accordance with the invention in that the sensitivity of the electrometer probes is calibrated in that two probes scan an identical section of the image, the sensitivity of the probes being determined by comparison of the output signals thus produced, the sensitivity being used to correct the pixel values.

When an identical section of the charge pattern is successively scanned by two electrometer probes, the output signals of the two probes should be equal. If they are not equal, the difference between the output signals of the two electrometer probes can be attributed directly to a difference in sensitivity. If this operation is successively performed for all electrometer probes intended to scan the charge patterns, the relative sensitivities of all electrometer probes with respect to one another can thus be determined. On the basis of these values, a correction of the pixel values takes place in such a manner that the pixel values generated by a given electrometer probe are corrected for the previously determined sensitivity.

This method offers the advantage that different probe apertures, deviating probe-selenium distances and different input capacitances of the circuits in which the output signals of the electrometer probes are further processed can be compensated for by the described calibration process. Moreover, fluctuations of the sensitivities of the various probes which may occur in course of time can also be compensated for. Depending on the required accuracy of the sensitivity compensation, the method can be performed before or after each X-ray exposure but also at given time intervals. The compensation of the sensitivities of the electrometer probes can be very accurately performed and depends only on the accuracy of the calculation of the different sensitivity values or the correction of the pixel values.

According to one version of the method, the charge density is scanned line-wise by the electrometer probes, the probes scanning the same image line for calibration. For the described calibration of the sensitivity of the probes the least mathematical effort is required when all probes scan the same image line. All scanning values can then be directly compared and used for determining the sensitivity values.

According to a second version of the method, in accordance with the invention, the charge density is scanned line-wise and each time two neighboring probes scan the same image line for calibration. In given mechanical configurations of a device for performing the method it may be impossible to guide all probes along the same line of the charge pattern. For calibration two probes are guided along an image line in such a case. Thus, different image lines are used for calibration. However, because each scanned image line has been scanned by two probes, the relative sensitivities of the neighboring probes can be determined. For each individual probe, therefore, two relative sensitivity values with respect to the two neighboring probes are obtained. Thus, even when the contents of the scanned image lines differ, a relative sensitivity of the probes can be determined for all probes.

According to a further version of the described method, involving a plurality of electrometer probes which are adjacently arranged at the same distance from one another and which scan one line in order to determine the charge image, the probes are subsequently displaced over a distance of two lines in the direction perpendicular to the scanning direction. The operation is repeated until all lines have been scanned once, the probes being displaced one line distance further for calibration of the probe sensitivity. Each probe scans a line which has already been scanned by another probe, the twice present pixel values being used for determining the sensitivity of the probes and for correcting all pixel values.

Because the electrometer probes cannot be realised arbitrarily close to one another, in relevant devices the probes are usually displaced perpendicularly to the scanning direction. Thus, several image lines can be successively scanned by means of one probe. For such scanning methods it is advantageous to displace the probes one line distance further for calibration of the probe sensitivity, i.e. the center-to-center distance of two neighboring image lines further. Each electrometer probe then scans a line of the charge image which has already been scanned by another electrometer probe. For neighboring electrometer probes again two scanning values of one and the same image line are thus produced, so that the relative sensitivities of the electrometer probes can again be determined in the described manner.

BRIEF DESCRIPTION OF THE DRAWING

The invention will be described in detail hereinafter with reference to the drawing.

The FIGURE shows a block diagram of a device for performing the method.

The FIGURE diagrammatically shows a photoconductor 1 which comprises several, narrow, rectangular sections $a_1 \ldots a_3$, $b_1 \ldots b_3$, $c_1 \ldots c_3$ and $d_1 \ldots d_3$.

At the area of the photoconductor there is provided a probe carrier 2 on which four electrometer probes 3, 4, 5 and 6 are arranged in a row. As will be described in detail hereinafter, the electrometer probes 3, 4, 5 and 6 serve to scan the rectangular sections $a_1 \ldots d_3$ of the photoconductor 1.

The photoconductor 1 is displaceable in the X-directions in a manner not shown in the Figure; this displacement is controlled by means of a control unit 7 which is shown as a block in the Figure.

There is also provided a further control unit 8 which serves to displace the probe carrier 2 in directions perpendicular to the narrow, rectangular sections $a_1 \ldots d_3$.

For the following description of the calibration of the sensitivities of the electrometer probes 3 to 6, it is assumed that the photoconductor 1 has been uniformly charged (in a manner not shown in the Figure) prior to an X-ray exposure, that it has been discharged by the subsequent X-ray exposure to a locally different extent in dependence on the intensity of the X-rays, and that its surface carries a charge pattern after the exposure.

This charge pattern can be scanned, for example in that the probe carrier 2 with the electrometer probes 3 to 6 is displaced across the photoconductor 1 in the X-directions. First, the section $a_1$ is scanned by the electrometer probe 3, the section $b_1$ is scanned by the electrometer probe 4, the section $c_1$ is scanned by the electrometer probe 5, and the section $d_1$ is scanned by the electrometer probe 6. The output signals thus produced by the electrometer probes are further processed after an analog-to-digital conversion, for each pixel there being formed a pixel value which corresponds to the discharge at the relevant pixel. Subsequent to this operation, the probe carrier 2 is displaced in the Y-directions, that is to say over a distance equal to two of the rectangular sections $a_1$ to $d_3$. Subsequently, a further scanning operation is performed during which the section $a_2$ is scanned by the electrometer probe 3, the section $b_2$ is scanned by the probe 4, the section $c_2$ is scanned by the probe 5, and the section $d_2$ is scanned by the probe 6. This operation, including the subsequent displacement of the probe carrier 2, is repeated until all sections have been scanned. In the example shown in the Figure, three sections would be scanned per probe. This example has been greatly simplified in order to clarify the operation. In reality, there would be a much larger number of image lines and also more electrometer probes for the scanning of a photoconductor. Moreover, the width of the rectangular sections $a_1 \ldots d_3$ would be very much smaller in relation to their length than as shown which is not to scale for purposes of illustration only.

After the described scanning operation, the pixel values thus obtained can be further processed. Due to differences in sensitivity of the electrometer probes 3 to 6, however, streak-like artefacts could then occur in the image. For example, if the sensitivity of the electrometer probe 4 is lower than that of the other electrometer probes 3, 5 and 6, a dark streak would occur in the image at the area scanned by the electrometer probe 4. Therefore, in accordance with the invention there is provided a method and device which enables calibration of the sensitivity of all electrometer probes. The calibration operation can be performed before or after the scanning of an X-ray image. The scanning values of the charge pattern obtained in the described manner are stored in a scanning value memory 10 in digital form after having passed an analog-to-digital converter 9.

After the scanning operation, the scanning value memory 10 stores one complete X-ray image which contains for each pixel a pixel value which corresponds to the discharge at the relevant pixel.

For the calibration of the electrometer probes, before or after the scanning of the charge pattern of the actual X-ray image, the probe carrier 2 is displaced, for example so far that the electrometer probe 3 scans the rectangular section $b_1$, the probe 4 scans the section $c_1$ and the probe 5 scans the section $d_1$. The scanning values thus obtained for each scan line of the sections are stored in an intermediate memory 11 after having passed the analog-to-digital converter 9.

In the result, the rectangular section $b_1$ has been scanned once by the electrometer probe 4. The corresponding scanning values are stored in the scanning value memory 10. However, the section $b_1$ has also been scanned by the electrometer probe 3; the scanning values thus obtained are stored in the intermediate memory 11. The two scanning values obtained during the scanning of the same section are compared in an arithmetic device 12 which can access the scanning values stored in the scanning value memory 10 as well as those stored in the intermediate memory 11. A difference in sensitivity of the electrometer probes 3 and 4 can be attributed directly to the difference between the sampling values. For example, for the electrometer probe 4 a sensivitity quotient can be determined which indicates the extent to which the electrometer probe 4 is more sensitive or less sensitive than the electrometer probe 3.

This operation is performed not only for the section $b_1$, but also for the sections $c_1$ and $d_1$ which, however, are scanned by the probes 4 and 5 for the calibration of the probe sensitivity. The relevant quotients are also determined between these probes and the probe 6, which quotients are also stored in the quotient memory 13. It is possible to recalculate the quotients of the electrometer probes 3, 4, 5 and 6 together to a relative sensitivity of the electrometer probes 4, 5 and 6 with respect to the electrometer probe 3. The quotients determined are applied to a second arithmetic device 14. Therein, the scanning values of the probes 4, 5 and 6 which are stored in the scanning value memory 10 are multiplied by the sensitivity quotients individually determined for these probes. Thus, a correction of the pixel values takes place during which the sensitivity of the probe used to form the pixel value is taken into account. The pixel values thus corrected appear on an output 15 of the second arithmetic device 14 for the complete image, for each pixel of which a pixel value corresponding to the discharge at the relevant pixel is present.

It is to be noted that for the calibration of the sensitivity of the electrometer probes it is important merely that each time two neighboring probes scan one and the same section $a_1$ to $d_3$. For example, it would also be possible to make all electrometer probes 3, 4, 5 and 6 successively scan the section $b_3$. For calibration of the section $a_3$ by means of the probe 4, it would also be possible, for example to scan again the section $b_3$ by means of the probe 5 and the section $c_3$ by means of the probe 6.

What is claimed is:

1. A method of scanning an X-ray image employing electrometer probes which scan charge patterns of a photoconductor surface after X-ray exposure for determining the charge density of the photoconductor which is locally uniformly charged prior to X-ray exposure and is discharged by the exposure in dependence on the intensity of the X-rays, said probes forming for each pixel of the scanned image a pixel value which corresponds to the discharge at the relevant pixel, said method comprising:

scanning an identical section of the photoconductor after exposure to said X-rays with two probes, said probes each forming for each pixel an output signal which has a pixel value which corresponds to the discharge at the relevant pixel;

determining the sensitivity of the two probes by comparing their output signals to calibrate the probes; and correcting the pixel values according to said compared outputs.

2. A method as claimed in claim 1 including scanning the charge density line-wise with the the electrometer probes, the probes scanning the same image line for calibration.

3. A method as claimed in claim 1 including scanning the charge density line-wise, each time two neighboring probes scanning the same image line for calibration.

4. A method as claimed in claim 3, involving a plurality of electrometer probes which are adjacently arranged at the same distance from one another and which scan each time one line in a given direction in order to determine the charge image, displacing the probes over a distance of two lines in a direction perpendicular to the scanning direction, repeating said operation until all lines have been scanned once, displacing the probes one line distance further for calibration of the probe sensitivity, causing each probe to scan a line which has already been scanned by another probe, using the twice present pixel values for determining the sensitivity of the probes and for correcting all pixel values.

5. A device for scanning an X-ray image employing electrometer probes which scan charge patterns of a photoconductor surface after X-ray exposure for determining the charge density of the photoconductor which is locally uniformly charged prior to X-ray exposure and is discharged by the exposure in dependence on the intensity of the X-rays, said probes forming for each pixel of the scanned image a pixel value which corresponds to the discharge at the relevant pixel, said device comprising:

at least two probes for scanning an identical section of the photoconductor after exposure to said X-rays, said probes each forming for each pixel an output signal which has a pixel value which corresponds to the discharge at the relevant pixel;

means for determining the sensitivity of the at least two probes by comparing their output signals to calibrate the probes; and means for correcting the pixel values according to said compared outputs;

said means for determining including memory means for storing the pixel values supplied by each of the probes and which values are proportional to the charge density on the photoconductor;

said means for correcting including means for determining the quotients of the stored values of each said probes to provide a measure of the sensitivities of said at least two probes and means for multiplying the pixel values of each image line of a scanned X-ray image by the quotient corresponding to those values.

6. A device for scanning an X-ray image employing electrometer probes which scan charge patterns of a photoconductor surface after X-ray exposure for determining the charge density of the photoconductor which is locally uniformly charged prior to X-ray exposure and is discharged by the exposure in dependence on the intensity of the X-rays, said probes forming for each pixel of the scanned image a pixel value which corresponds to the discharge at the relevant pixel, said device comprising:

at least two probes for scanning an identical section of the photoconductor after exposure to said X-rays, said probes each forming for each pixel an output signal which has a pixel value which corresponds to the discharge at the relevant pixel;

means for determining the sensitivity of the at least two probes by comparing their output signals to calibrate the probes; and means for correcting the pixel values according to said compared outputs;

said means for determining including memory means for storing the pixel values supplied by the probes and which values are proportional to the charge density on the photoconductor, said memory means for storing the pixel values of a complete X-ray image and the pixel values of each scanned image line for each probe;

said means for correcting including means for determining a quotient which is the measure of sensitivities of the probes and means for multiplying the pixel values of each image line of a scanned X-ray image by the corresponding quotient.

said means for correcting including means for determining the quotients of the stored values to provide a measure of the sensitivities of said at least two probes and means for multiplying the pixel values of each image line of a scanned X-ray image by the quotient corresponding to those values.

7. A device for scanning an X-ray image employing electrometer probes which scan charge patterns of a photoconductor surface after X-ray exposure for determining the charge density of the photoconductor which is locally uniformly charged prior to X-ray exposure and is discharged by the exposure in dependence on the intensity of the X-rays, said probes forming for each pixel of the scanned image a pixel value which corresponds to the discharge at the relevant pixel, said device comprising:

a photoconductor on a photoconductive carrier;

at least two probes for scanning an identical section of the photoconductor after exposure to said X-rays, said probes each forming for each pixel an output signal which has a pixel value which corresponds to the discharge at the relevant pixel;

means for determining the sensitivity of the at least two probes by comparing their output signals to calibrate the probes; and means for correcting the pixel values according to said compared outputs.

* * * * *